Sept. 4, 1934.  D. GREGG  1,972,190
SUPERCHARGER
Original Filed April 4, 1931   2 Sheets-Sheet 1

INVENTOR
David Gregg.
BY
ATTORNEY

Sept. 4, 1934.  D. GREGG  1,972,190
SUPERCHARGER
Original Filed April 4, 1931   2 Sheets-Sheet 2
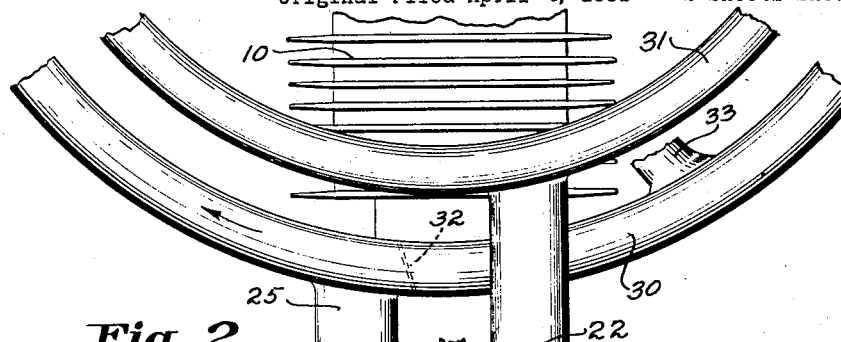
Fig. 2.
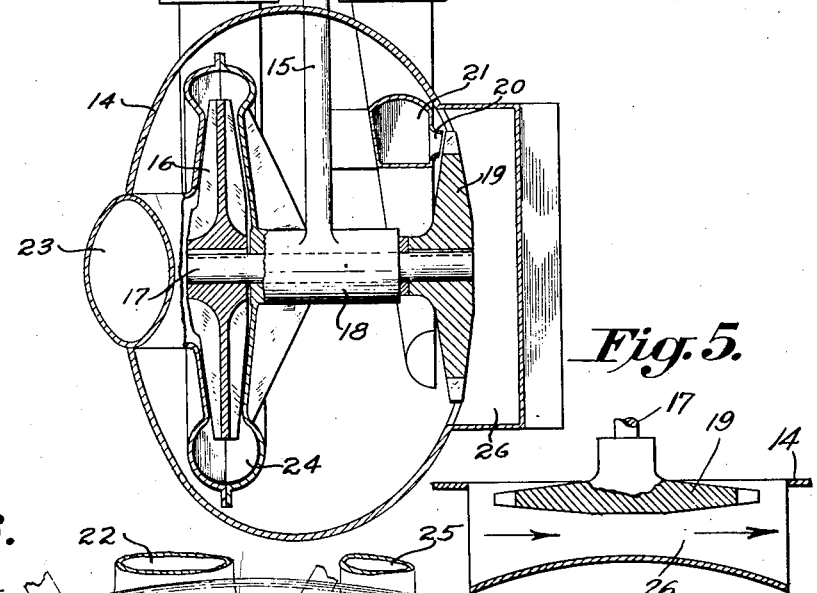
Fig. 5.
Fig. 3.
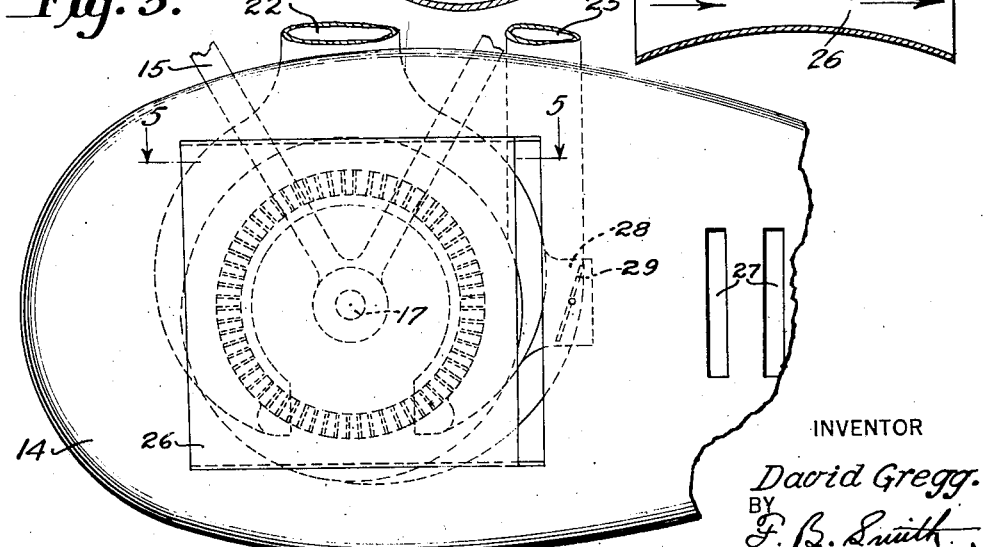
INVENTOR
David Gregg.
BY
F. B. Smith
ATTORNEY Patented Sept. 4, 1934

1,972,190

UNITED STATES PATENT OFFICE 1,972,190

SUPERCHARGER

David Gregg, Caldwell, N. J., assignor to Bendix Research Corporation, East Orange, N. J., a corporation of Indiana Application April 4, 1931, Serial No. 527,804
Renewed March 8, 1934

9 Claims. (Cl. 244—31)

This invention relates to superchargers for internal combustion engines, and more particularly to supercharging apparatus of the type adapted for use with aircraft engines.

One of the objects of the present invention is to provide a novel supercharging apparatus for an aircraft engine.

Another object is to provide supercharging apparatus for an aircraft engine wherein a novel arrangement of the engine cowling permits cooling of the supercharger's output during its passage to the intake of the engine, said cowling also being adapted to act as a portion of the means supplying exhaust gases from the engine to the turbine driving the supercharger.

A further object is to provide a novel form of housing for a supercharger operated by an exhaust gas turbine which housing is situated in an air stream and is equipped with means for creating a suction therewithin thereby facilitating the flow of the exhaust gases through the turbine.

Still another object is to provide a novel supercharging system for an aircraft engine which, by a novel change in the construction of the engine cowling, allows it to be used also as an intercooler and as distributing means for the compressed charge and for the exhaust gases from the engine, thereby effecting a substantial saving in weight and an increase in efficiency of the engine installation.

These and other objects will appear more fully from a consideration of the detail description of the invention which follows. Although only two embodiments of the invention have been described and illustrated in the accompanying drawings, it is to be expressly understood that these drawings are for the purpose of illustration only and are not to be construed as a limitation of the scope of the invention, reference being had for this purpose to the appended claims.

In the drawings:

Fig. 2 is a front view on an enlarged scale of a portion of the embodiment shown in Fig. 1 with certain parts shown in section;

Fig. 3 is a side elevation on an enlarged scale of a portion of the embodiment shown in Fig. 2;

Fig. 5 is a sectional view taken on line 5—5 of Fig. 3.

Figure 1:
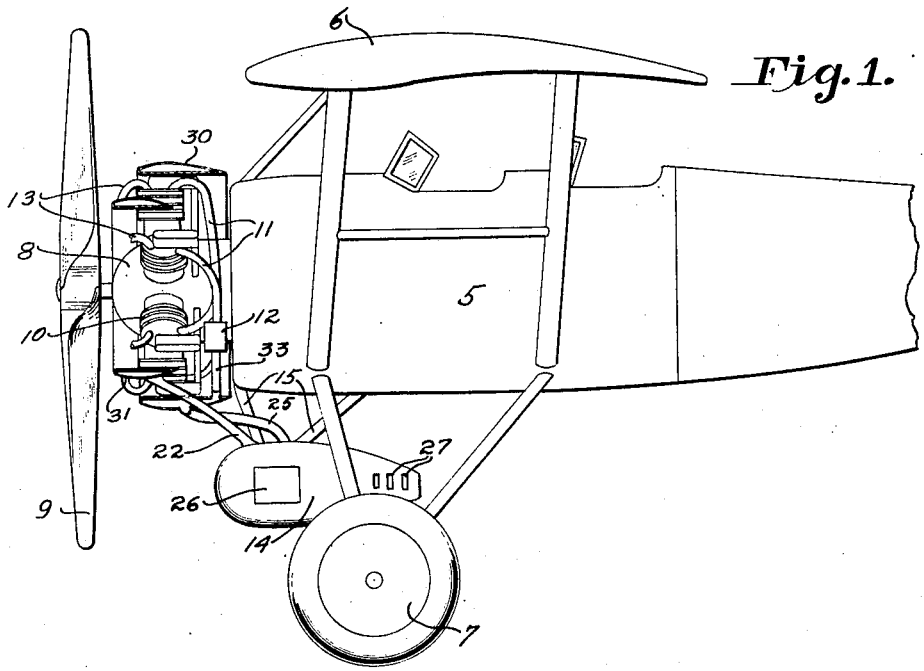
Fig. 1 is a side elevation of an aeroplane with the cowling of its engine shown in section to illustrate one embodiment of the present invention.

In the drawings, wherein like reference characters indicate like parts throughout the several views, the embodiment of the invention disclosed in Figs. 1, 2 and 3 comprises a supercharging apparatus for an aircraft engine wherein the compressing mechanism is housed within a novel form of casing supported outside the body of the aircraft and in a suitable air stream and wherein the cowling of the engine is adapted to act both as an intercooler for the compressed charge during its passage to the intake of the engine, and as a distributer for said charge and for exhaust gases of the engine. As shown, the aeroplane is provided with a body or fuselage 5 and the usual wings 6, landing gear 7, engine 8 and propeller 9. Engine 8 is in turn provided with cylinders 10 having intake leads 11 connected to a carburetor 12 and exhaust leads 13. It will be understood that the structure thus far described may be of any desired form, not necessarily an aeroplane, and forms no part of the present invention except in so far as the elements thereof enter the combinations set forth in the claims.

Novel means are provided for housing the compressing means of the supercharger apparatus and for connecting it to the remainder of the installation. In the form shown, a streamlined housing 14 is suitably supported outside of the body or fuselage 5 of the aeroplane as by struts 15 and contains a compressor and the driving means therefor. Although these latter elements may be of any desired construction, the embodiment disclosed in Figs. 2 and 3 comprises a centrifugal compressor 16 mounted on a shaft 17, the latter being journalled in a bearing 18 formed by a junction of struts 15, and driven by a turbine, the rotor 19 of which is fixed to shaft 17 and is caused to rotate by the flow of exhaust gases from engine 8 through nozzles 20 formed in a suitable nozzle ring 21 to which said gases are supplied by a pipe or conduit 22. The charge of air, or other fluid, to be compressed is supplied to compressor 16 by a pipe or conduit 23 leading from the atmosphere to the central portion of the rotor of said compressor, while the compressed charge is collected within an annular casing 24 and thence delivered to a supply pipe or conduit 25 leading to the engine. The exhaust gases from the engine, after passing through the buckets of rotor 19 of the turbine, flow into a suitable chamber 26 projecting outwardly from the side of housing 14 and thence pass directly to the atmosphere the interior of housing 14 being ventilated through exhaust louvers 27. Chamber 26 is preferably constructed as the equivalent of a Venturi tube so as to create a suction at the exhaust side of the turbine and thereby facilitate the flow of the exhaust gases therethrough. A by-pass conduit 28, with valve 29, is connected to nozzle ring 21 whereby when it is wished to operate engine 8 without supercharging, the exhaust gases from the engine can be passed directly to atmosphere by opening said valve.

The engines of vehicles adapted for high speed, such as aeroplanes, are now commonly provided with means for decreasing wind resistance, such as cowling. In the present invention, a novel arrangement of cowling is provided which not only fulfills its function of decreasing wind resistance, but also serves as an intercooler between the supercharger and the engine, and as a distributor for the compressed charge and the exhaust gases. In the form shown, engine 8 is provided with an outer annular air stream member 30 and a similarly shaped inner air stream member 31, both of said members being hollow. Each of the exhaust leads 13 from the cylinders 10 is connected to inner air stream member 31, the latter thereby forming an exhaust manifold and being connected, in the form illustrated, at its lower portion to pipe or conduit 22 leading to nozzle ring 21 of the exhaust gas turbine. Outer air stream member 30, on the other hand, is connected to and receives from pipe or conduit 25 the output of compressor 16, and is provided internally thereof at a suitable point with a baffle or partition 32 which causes the compressed charge to flow, as indicated by the arrow in Fig. 2, around a substantial portion of outer member 30 before it reaches a pipe or conduit 33 which leads to carburetor 12, whence it is supplied by intake leads 11 to cylinders 10. It is evident that during this circuitous flow of the compressed charge, within a portion of the cowling which is directly exposed to the air stream, said charge will be partially cooled and thereby preventing the loss in volumetric efficiency of the engine due to excessive preheating of the charge.

Figure 4:
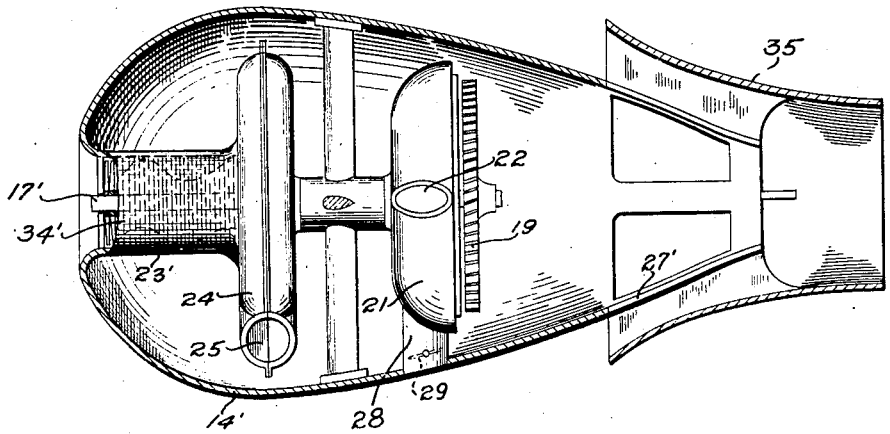
Fig. 4 is a sectional plan view of a second embodiment of the supercharger and turbine assembly.

An alternative form of compressor and turbine housing is shown in Fig. 4, which construction also provides a modified form of compressor. As shown, housing 14' has the same general streamline shape as the embodiment shown in Figs. 1, 2 and 3, and may be secured to the fuselage 5 in a similar manner. The compressor and turbine assembly is substantially the same as that shown in the first embodiment except that the axis of rotation of these members is in the fore and aft line of the casing instead of transverse thereto. Also, the supply pipe or conduit 23' leading to the compressor is centrally located on the longitudinal axis of housing 14', and provides a casing for a plurality of small propeller-type fans, indicated generally at 34', which are mounted on the shaft 17' of the compressor.

Still another modification disclosed in Fig. 4 is constituted by the provision of a funnel-shaped Venturi member 35 secured to housing 14' in any suitable manner and encircling the after end thereof. The exhaust louvers 27' are consequently arranged circumferentially of the after end of housing 14' and just within the bell mouth of Venturi member 35. With this construction, a substantial suction is created within Venturi member 35 which greatly facilitates the flow of the exhaust gases through the turbine and out of housing 14' through louvers 27'.

When the engine is operating, exhaust gases from cylinders 10 pass through exhaust leads 13 into inner hollow air stream member 31 and are conducted therefrom through pipe 22 to nozzle ring 21 of the turbine. These gases then pass through nozzles 20 and impinge upon the buckets of turbine rotor 19 to drive the turbine and shaft 17 in a well known manner. The exhaust gases then pass into chamber 26 and are exhausted to the atmosphere, this action being assisted by the suction created due to the Venturi-like construction of chamber 26. Since compressor 16 and turbine rotor 19 are mounted on a common shaft 17, the rotor of the former is given a high speed of rotation whereby the air or other fluid to be compressed entering through supply pipe 23 is compressed, collected in casing 24, and delivered by pipe 25 to outer hollow air stream member 30. The baffle or partition 32 prevents the direct passage of this compressed charge to pipe 33 which leads to the carburetor 12 of the engine, and causes said charge to circulate around a substantial portion of air stream member 30 before it reaches pipe 33, during which passage the charge is subjected to a material cooling effect. Pipe 33 then conducts the thus cooled charge through carburetor 12 whence it passes to cylinders 10 by intake leads 11.

There is thus provided by the present invention a novel form of supercharging apparatus which is especially adapted for use with aircraft engine installation. Due to the novel construction of the engine cowling, it has been made possible to effect a substantial saving in weight by using this cowling both as an intercooler between the supercharger and the engine, and as a distributing means for the exhaust gases which drive the supercharger turbine. Novel means have also been provided for housing the compressing portion of the supercharging apparatus and for supporting it in the direct path of the air stream from the aeroplane propeller. It will be understood that said compressing portion may be located, in certain installations, at any one of a number of positions other than the one illustrated herein. This housing has also been provided with means for facilitating the passage of the exhaust gases through the supercharger turbine and to the atmosphere. The structure provided by this invention is simple and rugged, and greatly improves the efficiency of the engine installation as a whole.

It will be obvious that the invention is not limited to the forms shown in the drawings, but is capable of a variety of mechanical embodiments. For example, any type of compressor may be substituted for the form shown, or the supply pipe leading to the compressor may be connected to any suitable source of fuel mixture instead of being open to the atmosphere as shown. Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In apparatus for supercharging an internal combustion engine the combination of a supercharger, a turbine actuated by the exhaust gases of said engine for driving said supercharger, and a pair of concentric hollow cowling for said engine having an air passage therebetween, one of said cowlings being connected to the exhaust of said engine and to said turbine for conducting the exhaust gases to said turbine, and another of said cowlings being connected to said compressor and to the intake of said engine for conducting the compressed charge to said intake, said last named cowling member having a partition therein for causing the compressed gases to pass around a considerable portion of the cowling.

2. In apparatus for supercharging an internal combustion engine the combination of a supercharger, a turbine actuated by the exhaust gases of said engine for driving said supercharger, a pair of concentric hollow annular cowling members having an air passage therebetween, means connecting one of said members to the exhaust of said engine and to said turbine for conducting exhaust gases to said turbine, and means connecting the other of said members to said supercharger and to the intake of said engine, said last named cowling member having a partition therein adjacent the connection with the supercharger for causing the compressed gases to flow uni-directionally around the cowling.

3. In apparatus for supercharging an internal combustion engine the combination of a supercharger, a turbine actuated by the exhaust gases of said engine for driving said supercharger, a pair of radially spaced hollow annular cowling members, means connecting one of said members to the exhaust of said engine and to said turbine for conducting exhaust gases to said turbine, means connecting the other of said members to said supercharger and to the intake of said engine, means in the intake cowling member for causing gases therein to flow in one direction around the cowling and Venturi tube means mounted adjacent said turbine for facilitating the flow of the exhaust gases therethrough.

4. In apparatus for supercharging an internal combustion engine the combination of a supercharger, a turbine actuated by the exhaust gases of said engine for driving said supercharger, a streamlined housing for said supercharger and turbine, and Venturi tube means mounted externally of said housing, and having its neck portion communicating therewith for facilitating the flow of the exhaust gases through said turbine and from said housing.

5. In apparatus for supercharging an internal combustion engine of an aeroplane, a supercharger, a turbine actuated by the exhaust gases of said engine for driving said supercharger, a streamlined housing for said supercharger and turbine, means supporting said housing outside the body of said aeroplane and in the air stream and Venturi tube means mounted externally of said housing for creating a suction therewith, said Venturi tube having its inlet and outlet openings directed substantially parallel to the air stream, and its neck portion in communication with said housing for ventilating the same and facilitating exhaust flow through the turbine.

6. In combination with a radial airplane engine, concentric exhaust and inlet manifolds therefor, said manifolds being arranged in radially spaced relation to provide an annular passage therebetween for directing air flow against the engine, said inlet manifold being arranged outwardly of said exhaust manifold, and a partition in said inlet manifold for causing a unidirectional air flow therein.

7. In combination with a radial airplane engine having a propeller driven thereby, concentric exhaust and inlet manifolds therefor, said manifolds being of aerofoil section and arranged in radially spaced relation to provide an annular passage therebetween for directing airflow against the engine, and said inlet manifold being arranged outwardly of said exhaust manifold whereby it receives a greater amount of cooling air from the propeller than is received by the exhaust manifold.

8. In an airplane having a body, a propeller and an engine, the combination of a turbine driven compressor for the engine, a housing for said turbine and compressor supported externally of said body and in the slip stream of the propeller, a pair of hollow radially spaced concentric cowling members around said engine, the outer of said cowling members being connected to said engine to form an inlet manifold therefor, a partition in said inlet manifold for causing gases to flow in one direction in said manifold, the inner of said cowling members being connected to said engine to form an exhaust manifold therefor, a conduit leading from said inlet manifold to said compressor, a conduit leading from said exhaust manifold to said turbine, and Venturi tube means secured to the compressor housing for facilitating exhaust gas flow through said turbine.

9. In an airplane having a body, a propeller and an engine, the combination of a turbine driven compressor for the engine, a housing for said turbine and compressor supported externally of said body and in the slip stream of the propeller, a pair of hollow radially spaced concentric cowling members around said engine, the outer of said cowling members being connected to said engine to form an inlet manifold therefor, a partition in said inlet manifold for causing gases to flow in one direction in said manifold, the inner of said cowling members bing connected to said engine to form an exhaust manifold therefor, a conduit leading from said inlet manifold to said compressor, a conduit leading from said exhaust manifold to said turbine, said turbine being arranged transversely of said housing and exhausting through the side thereof, and a Venturi tube on the side of the housing adjacent said turbine, said Venturi tube having its inlet opening arranged to receive air from the propeller for facilitating exhaust gas flow through said turbine.

DAVID GREGG.